United States Patent
Reul et al.

(10) Patent No.: US 8,809,742 B2
(45) Date of Patent: Aug. 19, 2014

(54) COATED DISK HAVING A HEATABLE COMMUNICATION WINDOW

(75) Inventors: Bernhard Reul, Herzogenrath (DE); Dang Cuong Phan, Aachen (DE); Günther Schall, Kreuzau (DE); Susanne Lisinski, Köln (DE); Jean-Luc Lesage, Compiègne (FR)

(73) Assignee: Saint-Gobain Glass France, Courbevoie (FR)

( * ) Notice: Subject to any disclaimer, the term of this patent is extended or adjusted under 35 U.S.C. 154(b) by 159 days.

(21) Appl. No.: 13/500,862

(22) PCT Filed: Dec. 3, 2010

(86) PCT No.: PCT/EP2010/068810
§ 371 (c)(1),
(2), (4) Date: Apr. 6, 2012

(87) PCT Pub. No.: WO2011/069901
PCT Pub. Date: Jun. 16, 2011

(65) Prior Publication Data
US 2012/0193341 A1     Aug. 2, 2012

(30) Foreign Application Priority Data
Dec. 11, 2009   (EP) .................................... 09178862

(51) Int. Cl.
*B60L 1/02*     (2006.01)
*B32B 17/10*    (2006.01)
*H05B 3/84*     (2006.01)
*E06B 7/00*     (2006.01)

(52) U.S. Cl.
CPC ............ *H05B 3/84* (2013.01); *B32B 17/10174* (2013.01); *H05B 2203/008* (2013.01); *H05B 2203/016* (2013.01); *B32B 17/10036* (2013.01)
USPC ........................................... 219/203; 219/522

(58) Field of Classification Search
USPC ................. 219/203, 522, 541, 219, 543, 546; 52/171.2
See application file for complete search history.

(56) References Cited

U.S. PATENT DOCUMENTS 6,765,177 B2 * 7/2004 Noguchi et al. .............. 219/203
7,731,373 B2 * 6/2010 Oskarsson et al. ............ 359/512

FOREIGN PATENT DOCUMENTS

DE  20 2005 016384 U1   2/2007
EP       1 168 888 A2    1/2002
(Continued)

OTHER PUBLICATIONS

PCT International Preliminary Report on Patentability issued on Jul. 4, 2012 for PCT Application No. PCT/EP2010/068810 filed on Dec. 3, 2010 in the name of Saint-Gobain Glass France.

(Continued)

*Primary Examiner* — Shawntina Fuqua
(74) *Attorney, Agent, or Firm* — Steinfl & Bruno, LLP (57) ABSTRACT

A transparent disk that can be electrically heated over a large surface area, comprising: a large-surface-area, electrically conductive, transparent coating, which is applied to a transparent substrate, at least two bus ribbons, which are electrically connected to the electrically conductive transparent coating, at least one locally delimited region free from the coating, wherein at least one heating conductor having two poles is applied inside the free region, and wherein the first pole is electrically connected to the electrically conductive, transparent coating and the second pole is electrically connected to the electrically conductive, transparent coating or a bus ribbon. A method for the production of the disk is also described.

21 Claims, 8 Drawing Sheets

(56) References Cited

FOREIGN PATENT DOCUMENTS

| | | | |
|---|---|---|---|
| EP | 1 466 877 | A1 | 10/2004 |
| EP | 1 605 729 | A2 | 12/2005 |
| EP | 1605729 | * | 12/2005 |
| WO | 2004/051869 | A2 | 6/2004 |
| WO | 2005/011052 | A2 | 2/2005 |

OTHER PUBLICATIONS

PCT Search Report (with English translation) of International Application PCT/EP2010/068810 filed on Dec. 3, 2010 in the name of Saint-Gobain Glass France.

* cited by examiner

Fig 8

COATED DISK HAVING A HEATABLE COMMUNICATION WINDOW

CROSS REFERENCE TO RELATED APPLICATIONS

The present application is the US national stage of International Application PCT/EP2010/068810 filed on Dec. 3, 2010, which, in turn, claims priority to European Patent Application 09178862.0 filed on Dec. 11, 2009.

The invention is in field of windowpanes with communication windows for sensors and camera systems, a method for their production and their use.

BACKGROUND

Motor vehicles, airplanes, helicopters, and ships are increasingly equipped with various sensors or camera systems. Examples are camera systems, such as video cameras, night vision cameras, residual light amplifiers, laser range finders, or passive infrared detectors. Motor vehicle identification systems are also increasingly used, for example, for toll collection.

Camera systems can use light in the ultraviolet (UV), visible (VIS), and infrared wavelength range (IR). Thus, objects, motor vehicles, and people can be precisely detected even during poor weather conditions such as darkness and fog. In motor vehicles, these camera systems can be placed behind the windshield in the passenger compartment. Thus, even in road traffic, they offer the capability of detecting hazardous situations and obstacles in a timely manner.

However, because of their sensitivity to weather conditions or airflows around the vehicle, such sensors must, in all cases, be protected by panes transparent to radiation. The sensor can be installed inside a motor vehicle. To ensure optimal function of the optical sensors, clean and condensation-free panes are absolutely essential. Condensation and icing clearly interfere with functionality since they clearly reduce the transmission of electromagnetic radiation. Whereas wiper systems can be used for water drops and dirt particles, they are usually inadequate in the case of icing. Here, systems that heat the pane segment associated with the sensor as needed at least briefly and thus enable uninterrupted use are essential.

Increasingly, panes have whole-surface coatings that are electrically conductive and transparent to visible light that protect, for example, the interior against overheating due to sunlight or overcooling or that effect selected warming of the pane upon application of an electric voltage. The panes with electrically conductive transparent coatings are, however, not suitable as transparent protective panes for sensors or camera systems because data-bearing radiation is not adequately transmitted through the coating. Consequently, the panes are customarily decoated in locally delimited regions and form a communication window for sensors and camera systems.

EP 1 605 729 A2 discloses an electrically heatable pane with a communication window. This communication window is kept free of condensation and ice by a heating device. The heating element is laminated into the pane at the position of the communication window. In addition, yet another heating element can be applied on the surface of the pane. The additional heating element is preferably printed onto the surface of the pane as conductive paste.

However, for this, it is necessary, in order to supply the heating conductor with electrical energy, to establish electrical contact with a power supply via current carrying strips.

SUMMARY

An object of the invention is to provide a pane with an improved heating device for communication windows.

A further object of the invention is to find a new method for production of panes with an improved heating device for communication windows as well as a new use therefor.

The objects are accomplished through the characteristics set forth in the independent claims 1, 12, and 15. Preferred embodiments of the invention are indicated through the characteristics of the subclaims.

A substantial advantage achieved with the invention consists in that heating conductors for communication windows make electrical contact and are supplied with electric power via the electrically conductive transparent coating of the pane. The supply voltage is provided through the drop in potential that that occurs across the communication windows in the electrically conductive transparent coating. An additional, and usually opaque, electrical connection to the heating conductor of the communication window can be omitted.

Customary electric voltages to supply large-surfaced pane heating are 14 V DC or 42 V DC for conventional motor vehicles, but even as much as 400 V DC for motor vehicles with electrical drive components.

The drop in potential across the communication window is calculated from the ratio of the measurement of the communication window vertical to the equipotential lines and the distance between the current collector strips lines, weighted with the supply voltage for the large-surfaced pane heating between the current collector strips.

In an advantageous embodiment of the invention, the total resistance of all heating conductors is from 70% to 130%, preferably from 95% to 105% of an equivalent substitute resistance of the locally delimited region free of the coating.

The equivalent substitute resistance is the resistance of a region of the pane according to the invention with the electrically conductive transparent coating, where the region has the same dimensions as the locally delimited region free of the coating. The equivalent substitute resistance corresponds to the resistance of the coated region that is removed during formation of the locally delimited region free of the coating. The equivalent substitute resistance is determined in the direction of the current of the remaining heating field.

The panes according to the invention are adapted in their size to the specifications of conventional glazings of motor vehicles. The panes have, preferably, a height and width of 10 cm to 200 cm. The panes are, preferably, designed as laminated glass panes with an adhesion-promoting polymer layer. The panes include, preferably, silicate glasses with a thickness of 0.8 mm to 4 mm.

Here, the term "width" means, in the case of a vertically positioned pane, the horizontal dimension; "height", the vertical dimension.

The communication windows are designed in their width and height according to the requirements of customary sensors and camera systems for motor vehicles. The communication windows according to the invention have, preferably, a width of 5 cm to 200 cm and a height of 5 cm to 200 cm, in order to provide an adequately large region for the transmission of the beam paths of sensors and camera systems. Particularly preferably, the communication windows are arranged in the edge region of motor vehicle glazings outside the A field of vision in accordance with ECE-R 43:2004.

Electrically conductive, transparent coatings of the panes include, preferably, layer sequences with indium tin oxide, zinc oxide, tin oxide, Ga, Al, Ag, Au, or mixtures thereof. The total thickness of the electrically conductive and transparent coatings is, preferably, 20 nm to 1 µm. The electrically conductive, transparent coatings have a high transmission of >70% for visible light. Infrared radiation is partially reflected.

The sheet resistance of the electrically conductive coating is, preferably, 0.5 ohms per square to 100 ohms per square.

The coatings are preferably applied to the entire surface of the pane. The coated panes can be partially decoated and, preferably, decoated on the edge.

In order to achieve a concentration of heat output in the beam path of the sensor and camera systems, it is advantageous according to the invention for the heating conductors to be designed as straight, meandering, or wavy lines.

The heat output of the heating conductors is calculated using their material-specific electrical resistance, their length, their width, and their height.

The surface density of the heat output can be adapted according to the invention by the spatial arrangement of the heating conductors in the communication window, preferably by completely or partially parallel, narrowly bundled, or meshing paths.

The distance between the heating conductors is, according to the invention, preferably 5 mm to 15 mm.

The heating conductor is, according to the invention, 0.05 mm to 20 mm wide, preferably 0.1 to 5 mm and particularly preferably 0.15 mm to 1 mm.

In one embodiment of the invention, the heating conductor is electrically connected on poles via low-ohmic contacting lines to the electrically conductive, transparent coating. The contacting lines are preferably wider compared to the heating conductor.

In an advantageous embodiment of the invention, heating conductors are connected via node points and at least two contacting lines to the electrically conductive transparent coating. The flow of current is distributed over a plurality of contacting lines and the flow density per contacting line is low. The total resistance of the heating conductors, which corresponds to the equivalent substitute resistance of the locally delimited region and of the region free of coating, then results from the total resistance of the heating conductors and of the contacting lines.

According to the invention, it is particularly advantageous for the contacting lines and the node points to be configured in the shape of a comb and for a plurality of comb tips to be in contact with the electrically conductive transparent coating. The drop in the potential and the currents appearing are already homogenized in the region of the communication window without contact with the electrically conductive transparent coating. Inhomogeneous thermal loads due to inhomogeneously distributed currents on the electrically conductive transparent coating are prevented.

The distance between the contacting lines on the electrically conductive transparent coating is preferably 1 mm to 30 mm, particularly preferably 5 mm to 15 mm.

A particularly advantageous reduction in the thermal load of the contacting lines is achieved if the distance according to the invention between the contacting lines on the electrically conductive transparent coating is constant.

To increase the area of the contact surfaces, the contacting lines are electrically connected to the electrically conductive transparent coating over a length of 0.5 mm to 100 mm, preferably 1 mm to 50 mm, particularly preferably from 3 mm to 10 mm.

A homogeneous temperature distribution of the contacting lines is obtained according to the invention by enlarging the contact regions with the electrically conductive coating parallel to equipotential lines of the electrically conductive transparent coating. The enlargement is preferably implemented in a triangular, rectangular, oval, round, or polygonal shape.

Local overheating on the electrically conductive and transparent coating is reduced.

The heat output can be arranged particularly advantageously in the communication window by forming the heating conductor from a conductive screen printing paste and preferably from a silver-containing screen printing paste.

In an alternative embodiment of the invention, the heating conductor can also be formed with metal wire or with metal wire mesh, preferably with silver, gold, copper, aluminum, platinum, or tungsten wire. In another alternative embodiment of the invention, the heating conductor can also be formed with metal foil.

The current collector strips and the contacting lines are preferably made according to the invention of conductive screen printing paste and preferably of silver-containing screen printing paste.

The layer thickness of the heat conductor is 1 µm to 50 µm, particularly preferably 5 µm to 30 µm.

Also discovered was a method according to the invention for production of a transparent pane electrically heatable over a large area, wherein an electrically conductive, transparent coating is applied on a transparent pane. The electrically conductive, transparent coating is removed in a locally delimited region, at least two current collector strips are applied on the electrically conductive, transparent coating and electrically connected to the electrically conductive transparent coating. At least one heating conductor and contacting lines are applied and electrically connected on a first pole to the electrically conductive transparent coating. On a second pole, the heating conductor and the contacting lines are connected to the electrically conductive transparent coating or to a current collector strip.

The electrically conductive transparent coating is preferably applied by physical and chemical deposition from the gas phase, particularly preferably by cathode sputtering.

In another preferred embodiment of the method according to the invention, the electrically conductive, transparent coating is removed in a locally delimited region by laser ablation or mechanical abrasion.

In a preferred embodiment of the method, the current collector strips, contacting lines, and/or the heating conductor are produced in a screen printing, ink jet, pulse jet, engraved roller, or offset printing process.

The preferred method has, in particular, the advantage that the current collector strips, the contacting lines, and heating conductor are applied and electrically connected in one process step.

Also discovered was a use of transparent pane electrically heatable over a large area as a heatable and/or a laminated glass windshield with heatable communication windows that reflect thermal radiation.

BRIEF DESCRIPTION OF THE FIGURES

The figures depict.

DETAILED DESCRIPTION

Figure 1:
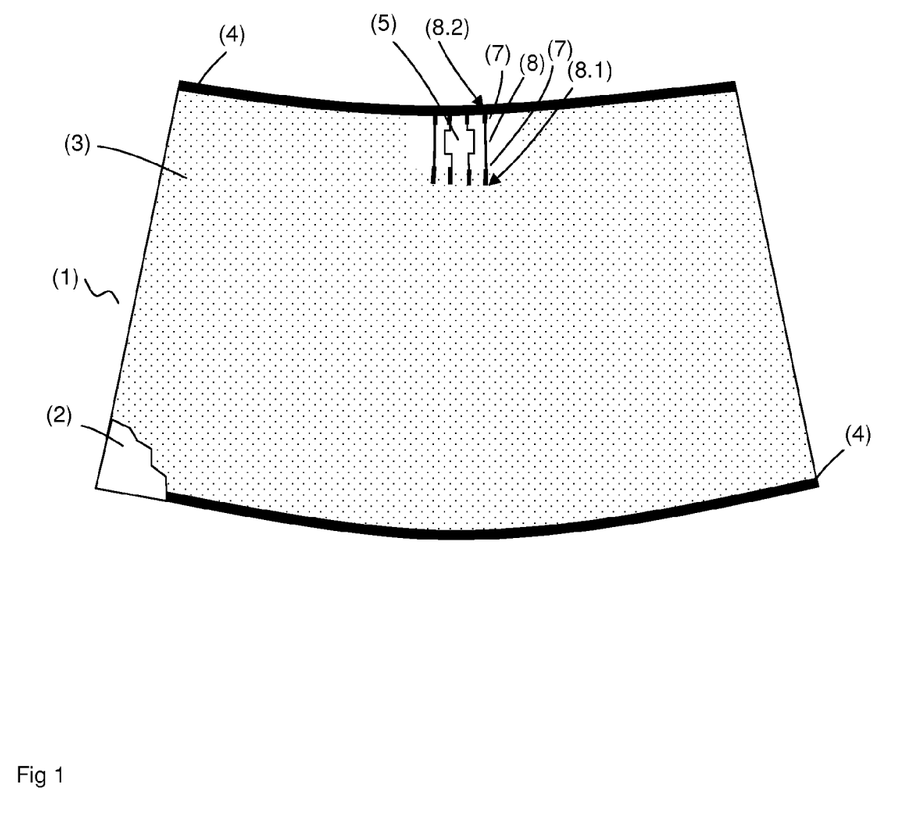
FIG. 1 a plan view of an exemplary embodiment of a transparent pane (1) electrically heatable over a large area, FIG. 2 a communication window (5) of the exemplary embodiment according to FIG. 1 in an enlarged depiction, FIG. 3 an alternative communication window (5) of an exemplary embodiment of the transparent pane (1) electrically heatable over a large area, FIG. 4 another alternative communication window (5) of an exemplary embodiment of the transparent pane (1) electrically heatable over a large area, FIG. 5 another alternative communication window (5) of an exemplary embodiment of the transparent pane (1) electrically heatable over a large area, FIG. 6 another alternative communication window (5) of the transparent pane (1) electrically heatable over a large area, FIG. 7 a plan view of an alternative exemplary embodiment of a transparent pane (1) electrically heatable over a large area, and FIG. 8 a detailed exemplary embodiment of a method according to the invention in a flow diagram.
Figure 2:
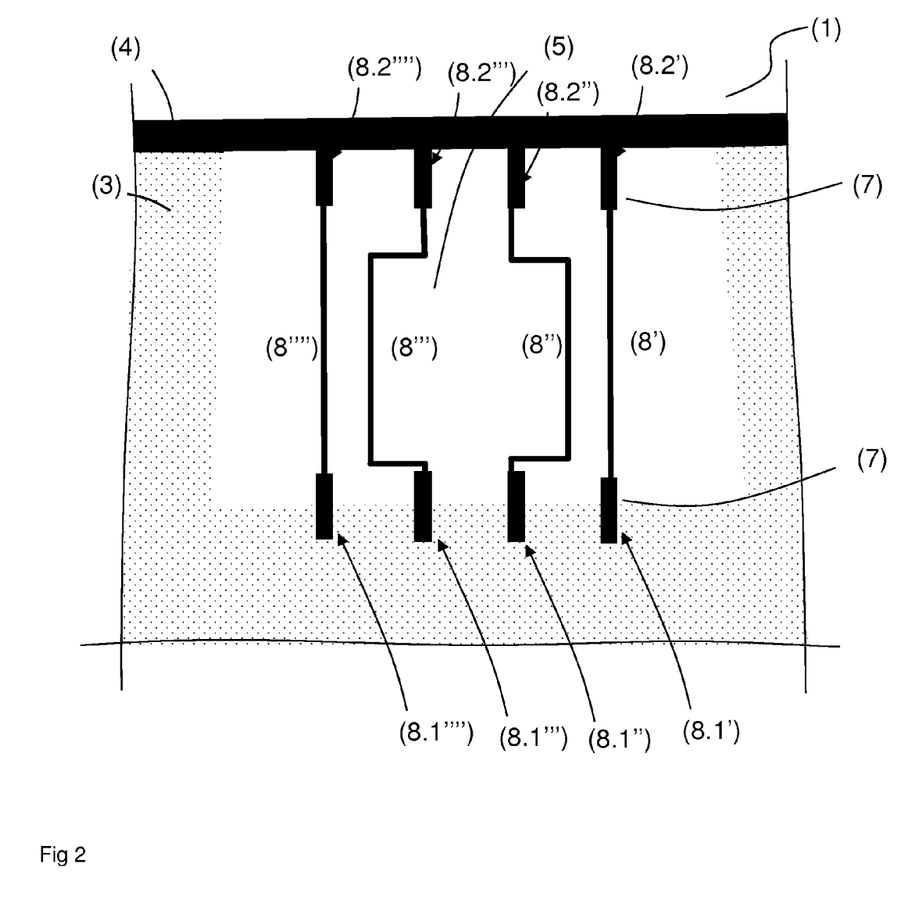

FIG. 1 and FIG. 2 depict a 100-cm-high and 120-cm-wide laminated glass windshield (1) according to the invention with a 10-cm-high and 20-cm-wide heatable communication window (5) for motor vehicles.

For large-surface heating and for thermal protection, an electrically conductive, transparent, and infrared-radiation-reflecting coating (3) was applied on a glass pane (2). The coating (3) had a sheet resistance of 0.5 ohms per square and included a transparent 5-nm- to 15-nm-thick silver layer. On two edges of the glass pane (2), the electrically conductive transparent coating (3) was electrically connected to 25-μm-thick opaque silver-containing current collector strips (4). The current collector strips were electrically connected to a 14-V voltage supply (not shown). The current flow over the current collector strips was 35 A. The total electrical heat output of the pane (1) was roughly 500 W. The pane (1) was implemented as a laminated glass pane. The electrically conductive transparent coating (3) was applied on the interior side of the laminated glass windshield (1). The laminated glass windshield (1) had a transparency of at least 70% for visible light. Infrared radiation was reflected. On the top edge of the laminated glass windshield (1), an IR camera (not shown) was installed on the side facing the vehicle interior. In the beam path for the IR camera and in the adjacent area, a communication window (5) transparent to infrared radiation was formed by an opening in the electrically conductive, transparent coating (3). Within the communication window (5), in the immediate vicinity of the beam path of the IR camera, four opaque linear heating conductors (8',8",8'",8"") were applied on the glass pane (2). The line width of the heating conductors (8',8",8'",8"") was 0.5 mm. The heating conductors (8) were connected in parallel and formed an electrical network. The heating conductors (8) made of silver screen printing paste add a layer thickness of 25 μm. The cumulative current flow through the network of heating conductors (8) was roughly 5.5 A. The drop in potential over the network of heating conductors (8) was roughly 1.4 V. The cumulative heat output of the network of heating conductors (8) was roughly 7.5 W. The total resistance of the heating conductors (8), i.e., the ohmic resistance of the network of heating conductors (8) was roughly 0.25 ohms. The total resistance of the heating conductors (8) corresponds to the equivalent substitute resistance of the communication window (5). The heating conductors (8',8",8'",8"") were electrically connected on poles (8.1',8.1",8.1'",8.1"") via contacting lines (7) at a width of 2 mm and a length of 5 mm to the electrically conductive transparent coating (3). The heating conductors (8',8",8'",8"") were in each case electrically connected on two poles (8.2',8.2",8.2'",8.2"") directly via another contacting lines (7) to a current collector strip (4). It was possible to prevent moisture, water, and ice accumulations on the laminated glass windshield (1) in the region of communication window (5). The voltage supply of the heating conductors (8',8",8'",8"") was realized with the electrically conductive transparent coating (3). The heat output was adjusted by coordination of the specific electrical resistance, the layer thickness, length, and width of the network of heating conductors (8',8",8'",8""). It was surprising and unforeseeable for the person skilled in the art that a voltage supply for heating conductors (8',8",8'",8"") of communication windows (5) could be provided in a simple manner via the electrically conductive transparent coating (3).

Figure 3:
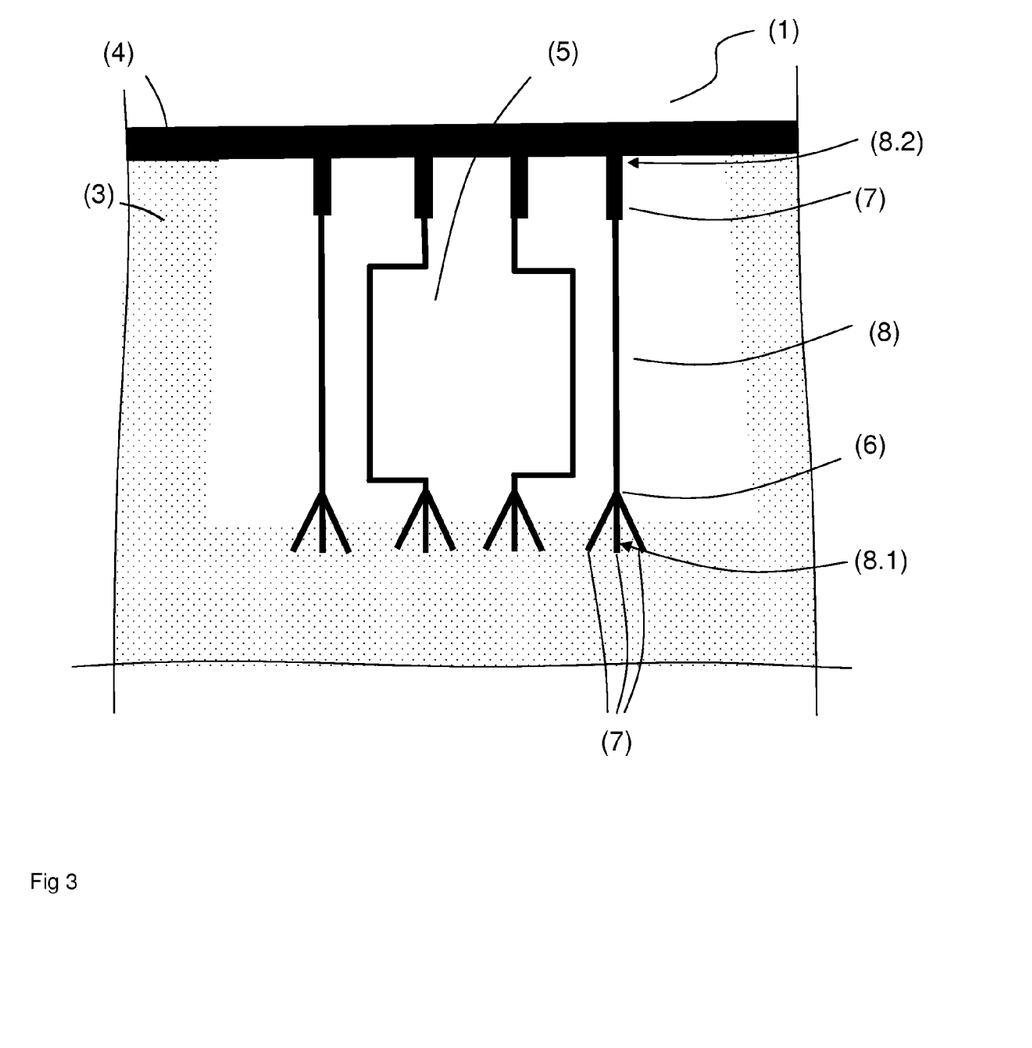

FIG. 3 depicts an alternative embodiment according to the invention of the communication window according to FIG. 2. To reduce the thermal loading of the contacting lines (7) in the region of the electrically conductive coating (3), the heating conductors (8) were electrically connected in each case via a node point (6) and a plurality of contacting lines (7) to the electrically conductive transparent coating (3).

Figure 4:
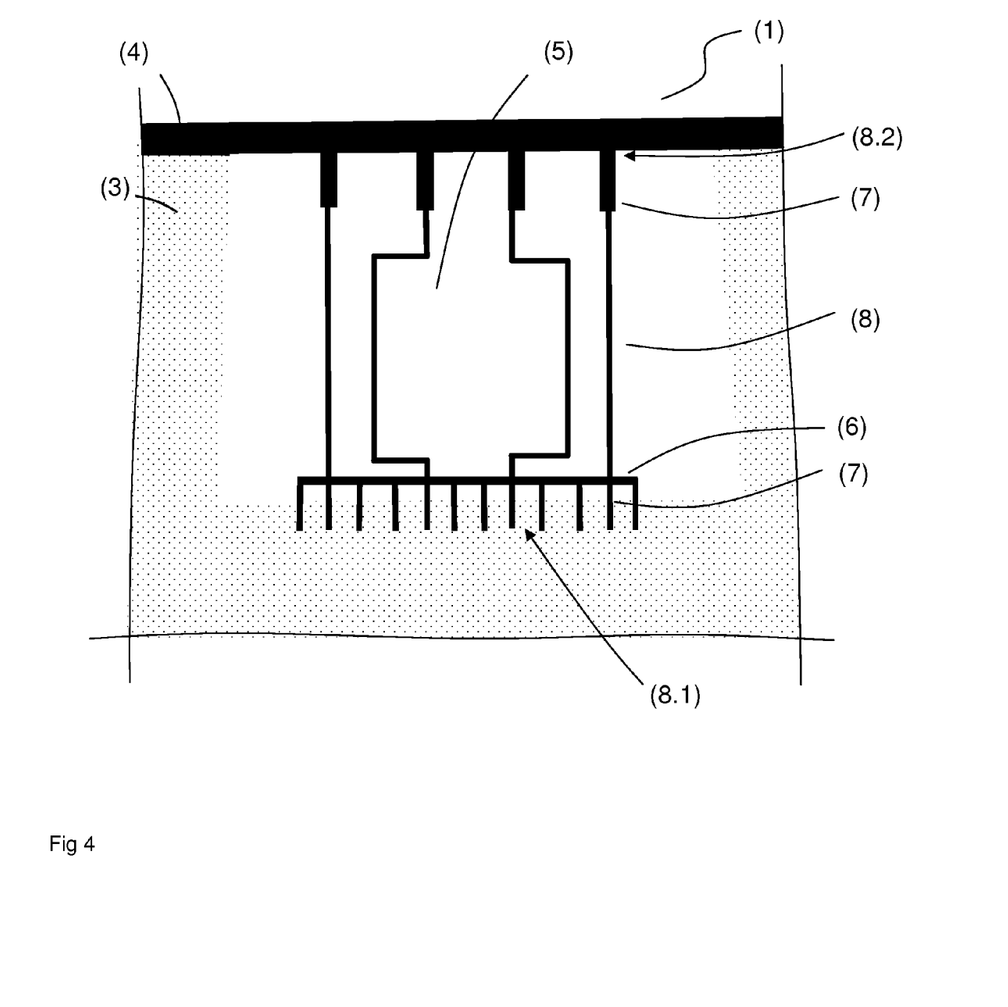

FIG. 4 depicts another comb-like embodiment according to the invention. The heating conductors (8) were connected in parallel in a current collection strip (6) in the communication window. A current collection strip (6) was applied as a node point directly on the glass pane (2) and had no direct contact with the electrically conductive transparent coating (3). Contacting lines (7) with a distance between them of 5 mm produced the electrical connection with the electrically conductive transparent coating (3). The flow densities in the contacting lines (7) were less than in the heating conductors (8). The thermal loading of the contacting lines (7) was minimized in the contact region with the electrically conductive transparent coating (3).

Figure 5:
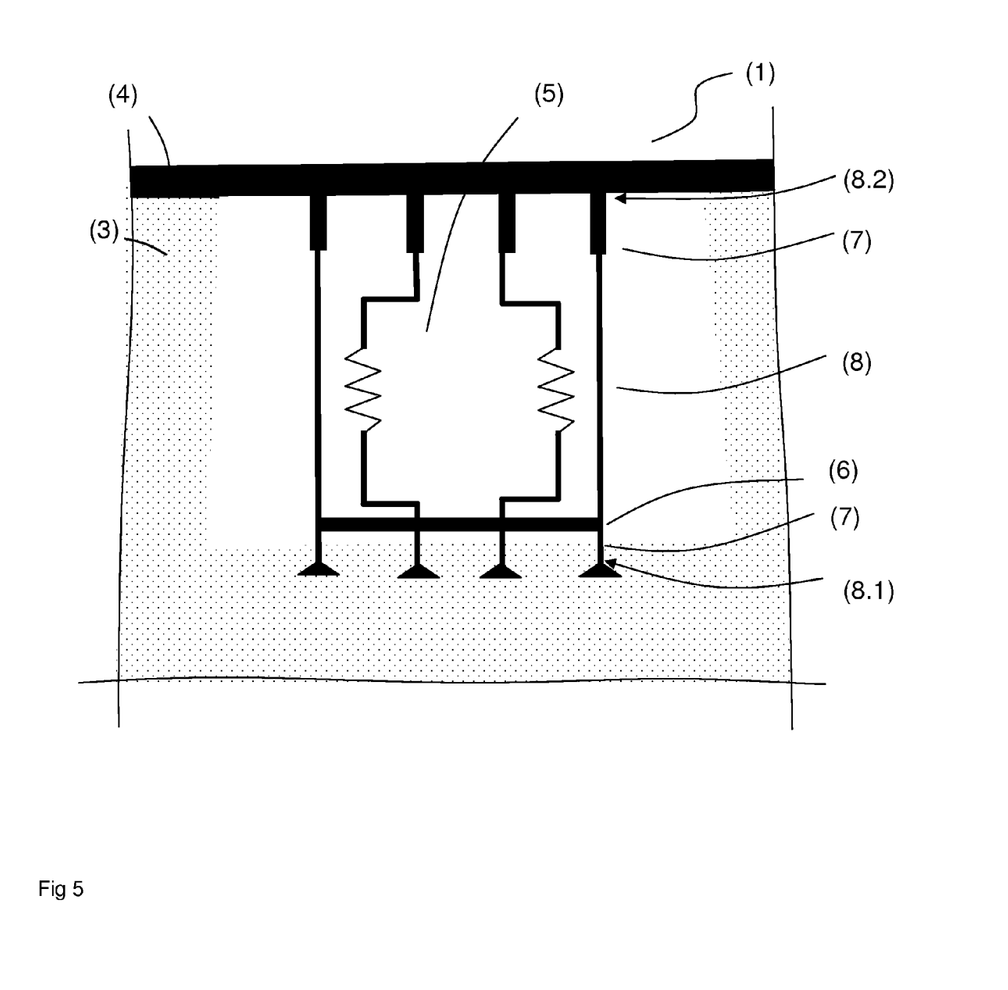

FIG. 5 depicts another alternative embodiment of the invention. The contacting lines (7) covered the electrically conductive, transparent coating (3) over a length of 10 mm and were configured in the shape of a triangle. The longest edge of the enlargement ran parallel to the equipotential lines of the electrically conductive transparent coating (3). Through the enlargement of the contacting lines (7), the flow densities were reduced and, in particular, the contact regions with the electrically conductive transparent coating (3) were thermally relieved. To concentrate the heat output in the center of the communication window (5), the heating conductors (8) had a relatively small line with of 0.15 mm and were configured meander-shaped in the immediate vicinity of the beam path of the infrared camera.

Figure 6:
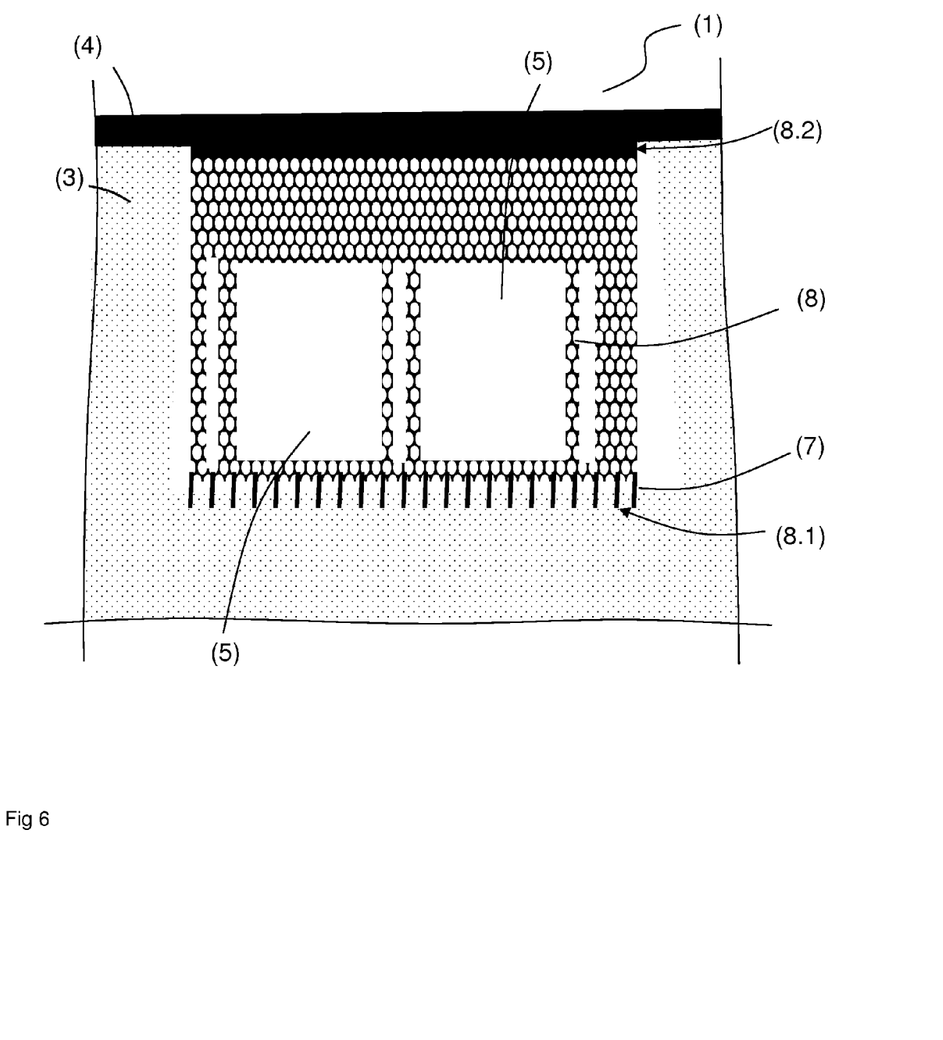

FIG. 6 depicts another embodiment of the invention. The heating conductors (8) and the contacting lines (7) were formed from a screen printing paste with a hole pattern. By means of this embodiment, the electrical sheet resistance and, consequently, the low-density in the heating conductors (7) could be adjusted more precisely. The heating conductors (8) were adapted to the shape according to band filter structures of motor vehicle window panes. A homogeneous aesthetic implementation was obtained for the viewer.

Figure 7:
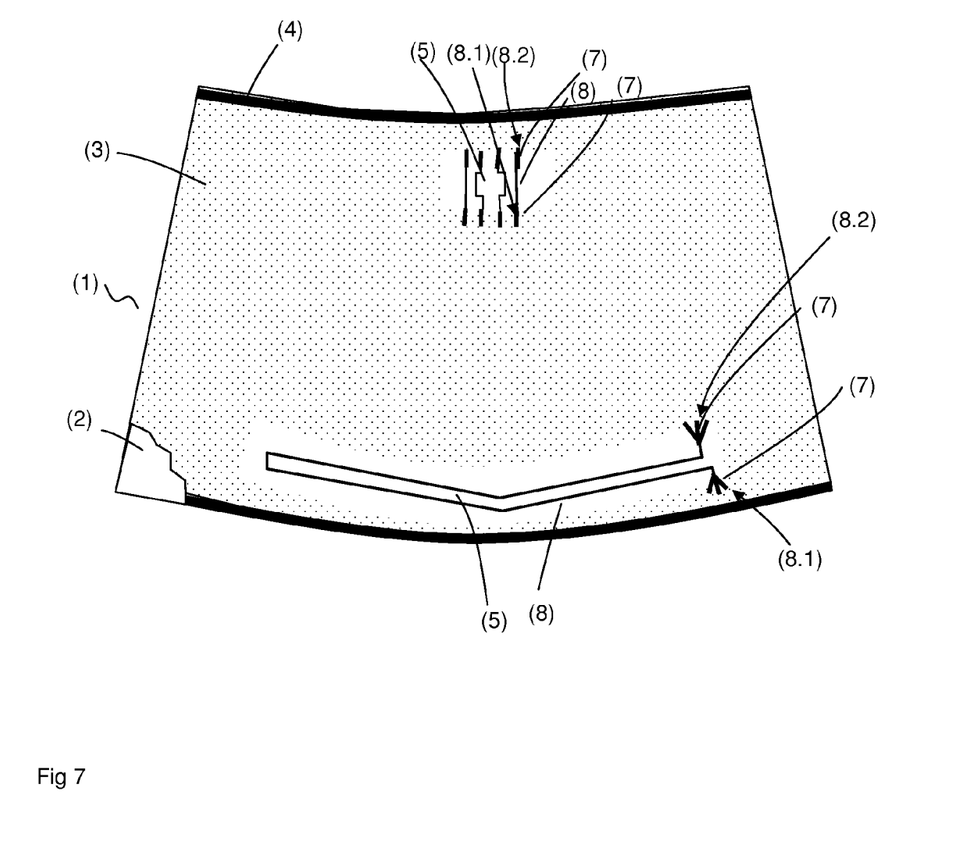
Figure 8:
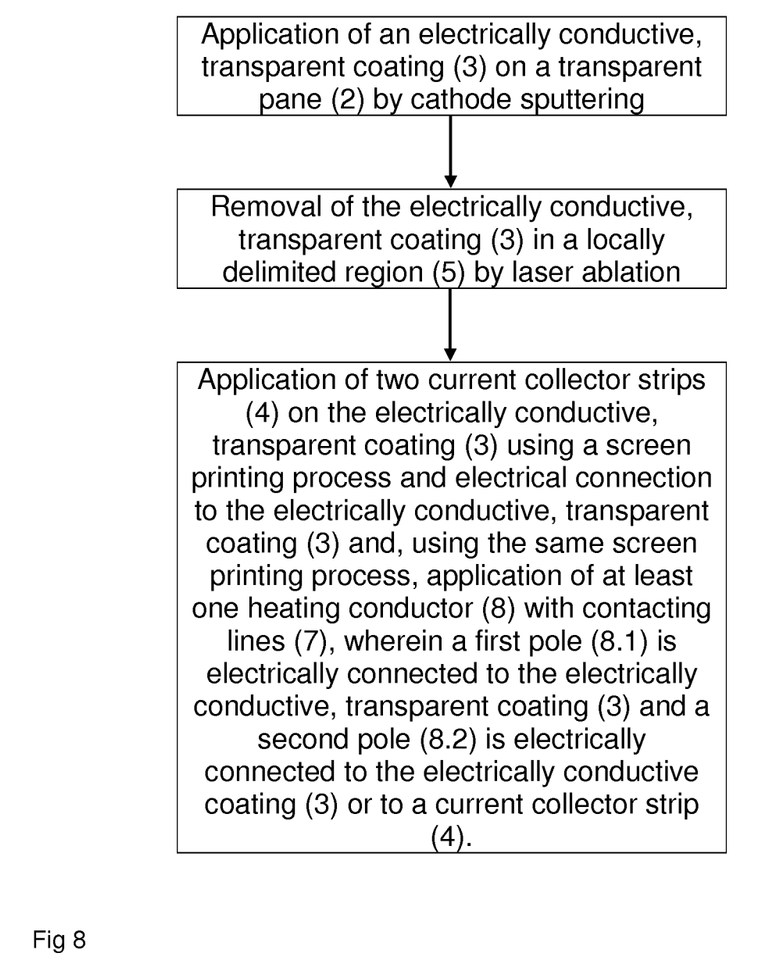

FIG. 7 depicts a plan view of a laminated glass windshield (2) according to the invention with two communication windows (5). One communication window (5) was configured in the upper region of the motor vehicle, another communication window (5) in a customary standby position of windshield wipers. Thus, it was possible, in a simple manner, to additionally obtain a de-icing surface for windshield wipers frozen in place. The contacting lines (7) of the heating conductors (8) were connected on both poles (8.1) (8.2) to the electrically conductive coating (3). It was surprising and unforeseeable for the person skilled in the art that an optimized heat output of the heating conductors (8) could be provided in a plurality of communication windows (5) with a single voltage supply via the electrically conductive transparent coating (3).

In FIG. 1 through 8, the reference characters have the following meaning:

(1) Transparent pane/Laminated glass windshield
(2) Transparent, electrically insulating substrate, (3) Electrically conductive transparent coating,
(4) Current collector strip,
(5) Free region without electrically conductive transparent coating (3)/Communication window
(6) Node point
(7) Contacting line
(8) Heating conductor
(8.1)(8.2) Poles of the heating conductor (8)

The invention claimed is:

1. A transparent pane electrically heatable over a large area, comprising:
    an electrically conductive transparent coating having a large surface, the electrically conductive transparent coating being applied on a transparent substrate;
    at least two current collector strips electrically connected to the electrically conductive transparent coating;
    at least one locally delimited region free of the electrically conductive transparent coating, each of the at least one locally delimited region being located between two current collector strips; and
    at least one heating conductor having a first pole and a second pole applied within the at least one locally delimited free region, wherein the first pole is electrically connected to the electrically conductive transparent coating and the second pole is electrically connected to either the electrically conductive transparent coating or to one of the at least two current collector strips.

2. The transparent pane according to claim 1, wherein a total resistance of the at least one heating conductor is from 70% to 130% of an equivalent substitute resistance of the at least one locally delimited region free of the coating.

3. The transparent pane according to claim 1, wherein the at least one heating conductor has a straight, meander, or wave shape.

4. The transparent pane according to claim 1, wherein the at least one heating conductor has a line width of 0.05 mm to 20 mm.

5. The transparent pane according to claim 1, wherein the first pole and the second pole are connected to at least one contacting line.

6. The transparent pane according to claim 1, wherein at least two contacting lines are electrically connected in at least one node point.

7. The transparent pane according to claim 6, wherein the at least two contacting lines and the at least one node point are comb shaped and the at least two contacting lines are electrically contacted in a form of comb tips with the electrically conductive transparent coating.

8. The transparent pane according to claim 1, wherein a distance between the at least two contacting lines is 1 mm to 30 mm and/or the distance between the at least one heating conductors is 5 mm to 15 mm.

9. The transparent pane according to claim 5, wherein the at least one contacting line is electrically connected to the electrically conductive coating over a length of 0.5 mm to 100 mm.

10. The transparent pane according to claim 1, wherein the at least one heating conductor comprises a conductive screen printing paste.

11. The transparent pane according to claim 1, wherein the at least one heating conductor has a layer thickness of 1 μm to 50 μm.

12. A method for production of a transparent pane electrically heatable over a large area, the method comprising:
    applying an electrically conductive transparent coating on a transparent substrate;
    removing the electrically conductive transparent coating from a locally delimited region;
    applying at least two current collector strips on the electrically conductive transparent coating and electrically connecting the at least two current collector strips to the electrically conductive transparent coating, wherein the locally delimited region is located between the at least two current collector strips; and
    applying and electrically connecting at least one heating conductor on a first pole to the electrically conductive transparent coating and applying and electrically connecting at least one heating conductor on a second pole to the electrically conductive transparent coating or to a current collector strip.

13. The method according to claim 12, further comprising removing the electrically conductive transparent coating in the locally delimited region with laser ablation or mechanical abrasion.

14. The method according to claim 12, wherein the at least two current collector strips, and/or the at least one heating conductor are produced in a screen printing, ink jet, pulse jet, engraved roller, or offset printing process.

15. A method comprising: using the transparent pane according to claim 1, as a motor vehicle glazing with a communication window or as a laminated glass windshield with a communication window.

16. The transparent pane according to claim 1, wherein a total resistance of the at least one heating conductor is from 95% to 105% of an equivalent substitute resistance of the at least one locally delimited region free of the coating.

17. The transparent pane according to claim 1, wherein the at least one heating conductor has a line width of 0.1 mm to 5 mm, or 0.15 mm to 1 mm.

18. The transparent pane according to claim 1, wherein a distance between the at least two contacting lines is 5 mm to 15 mm and/or the distance between the at least one heating conductors is 5 mm to 15 mm.

19. The transparent pane according to claim 5, wherein the at least one contacting line is electrically connected to the electrically conductive coating over a length of 1 mm to 50 mm, or 3 mm to 10 mm.

20. The transparent pane according to claim 1, wherein the at least one heating conductor comprises a silver-containing screen printing paste.

21. The transparent pane according to claim 1, wherein the at least one heating conductor has a layer thickness of 5 μm to 30 μm.

* * * * *